R. KROEDEL.
PHOTOGRAPHIC CAMERA.
APPLICATION FILED MAY 5, 1917.
1,239,017.
Patented Sept. 4, 1917.
2 SHEETS—SHEET 1.
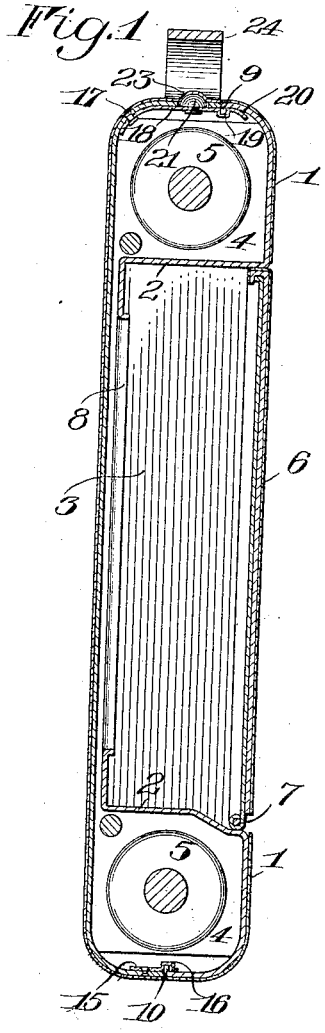
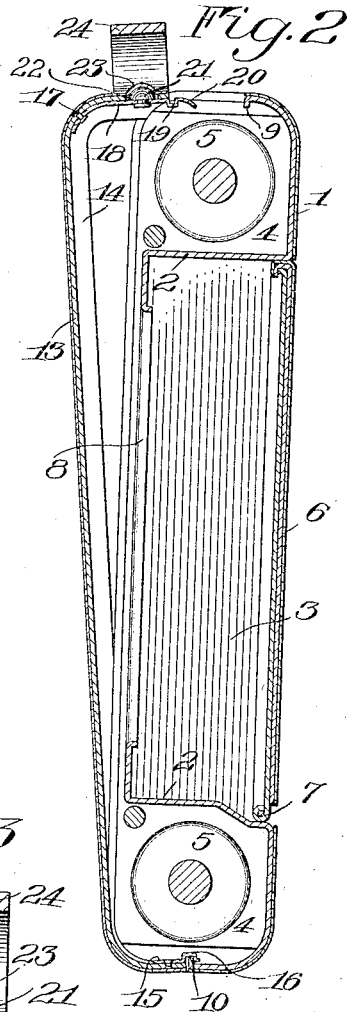
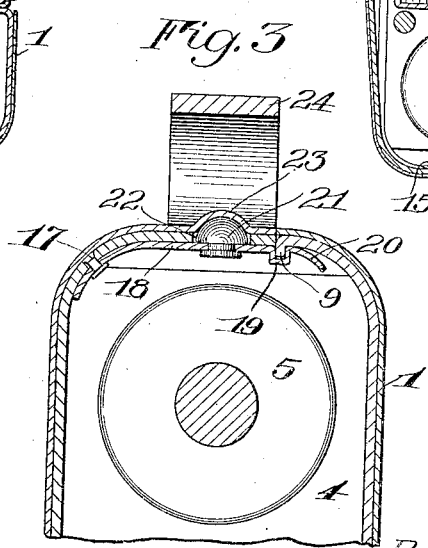
WITNESSES:
Nelson H. Copp
INVENTOR
Robert Kroedel
BY
his ATTORNEYS R. KROEDEL.
PHOTOGRAPHIC CAMERA.
APPLICATION FILED MAY 5, 1917.
1,239,017.
Patented Sept. 4, 1917.
2 SHEETS—SHEET 2.
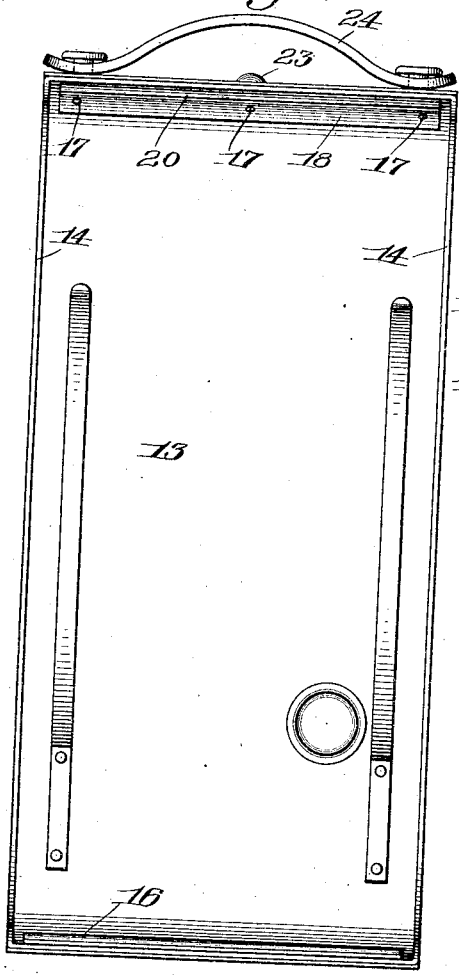
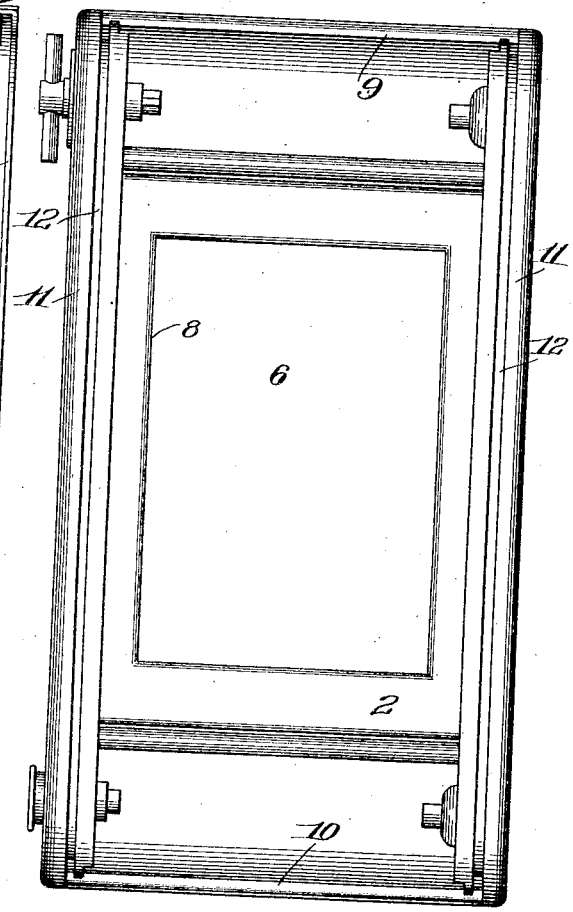
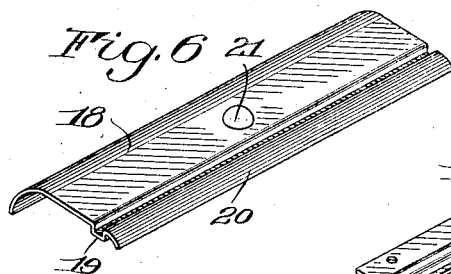
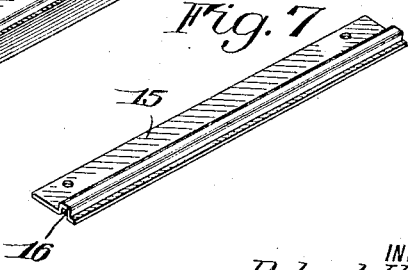
WITNESSES:
INVENTOR
Robert Kroedel
BY
his ATTORNEYS

# UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,239,017.

Specification of Letters Patent.

Patented Sept. 4, 1917.

Application filed May 5, 1917. Serial No. 166,568.

*To all whom it may concern:*

Be it known that I, ROBERT KROEDEL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a camera body or shell having a detachable or displaceable back so fitted thereto that a thoroughly light tight joint between the parts will be provided while at the same time, the back will be easily and quickly detachable, the whole construction being of simple and cheap construction and convenient for operation. To these and other ends the invention resides in certain improvements and combinations of parts all as will be hereinafter more fully described, the novel features being pointed out in the claims at the end of the specification.

In the drawings:

Figure 1 is a longitudinal central sectional view through a camera body constructed in accordance with and illustrating one embodiment of my invention, the same being shown closed;

Fig. 2 is a similar view but showing the back displaced;

Fig. 3 is an enlarged fragmentary view of the upper portion of Fig. 1;

Fig. 4 is an elevation of the inner side of the back;

Fig. 5 is an elevation of the rear of the body with the back removed;

Fig. 6 is a detail perspective view of a latch plate with which one end of the back is provided, and Fig. 7 is a detail perspective view of a plate with which the other end of the back is provided.

Similar reference numerals throughout the several views indicate the same parts.

The camera body shown in the present instance is of the usual general type being that employed in a folding film camera. The body shell is indicated at 1 and is extended to form the interior partition walls 2 between a central bellows and lens chamber 3 and film chambers 4 at the ends, the latter containing film spools 5. The usual combination door and bed 6 hinged at 7 closes the chamber 3 at the back of which is the exposure opening 8. These parts of the body may be formed from a single piece of sheet metal and the latter is provided at top and bottom with inwardly turned flanges 9 and 10. The side walls 11 of the body are preferably of separate heavier pieces and their back edges are formed with longitudinal grooves 12 extending to the region of the flanges 9 and 10 which flanges are forwardly of the rear edges of the side walls, as shown.

The back 13 may also be a substantially one-piece metallic shell and it has longitudinal edge flanges 14 at its sides that adapt it to be received within the grooves 12 of the body. Both ends are curved to conform to the shape of the body and to the front edge of the lower curved portion is secured, in the present instance, a plate 15 having an outwardly opening groove 16 therein. This grooved plate is adapted to fit over the lower flange 10 of the body in a light tight manner. Secured to the upper forwardly turned end of the back as by the rivets 17 is a spring plate 18, the forward edge of which is also provided with an outwardly opening groove 19 adjacent to which the plate terminates in a curved lip 20.

In applying the back to the body (the back being in the present instance, wholly detachable) the grooved plate 15 thereof is first engaged with the lower body flange 10, as shown in Fig. 2, and on this as a general center, the back is rocked into general engagement with the body, the side flanges 14 seating in the grooves 12. As the spring plate 18 approaches the upper body flange 9 it is first deflected or sprung inwardly by the engagement of the latter with the lip 20. The flange then clears the lip and engages within the groove 19 thereof, the plate snapping into this position automatically in the manner of a spring latch, as shown in Figs. 1 and 3. To release this locking engagement, the latch plate 18 carries a projecting push button 21 that extends through an aperture 22 in the back shell 13 and is thus made accessible from the interior though preferably concealed beneath the usual leather or other flexible covering 23 that constitutes the outer finish of the camera. Pressure on this button obviously deflects the plate 18 and permits the grooved portion 19 to clear the flange 9 so that the back can be tilted outwardly as in Fig. 2 and the disengagement from flange 10 then effected. This makes accessible the film chambers 4 and the whole interior of the body.

24 indicates a strap attached to the back to provide a hand hold for carrying the camera.

There is thus provided a flange and groove engagement between the back and body at all four sides making a thoroughly light tight structure that is easily assembled or separated while the locking arrangement involves the use of but few parts and those of a simple nature that may be provided at low cost.

I claim as my invention:

1. The combination with a camera body, of a displaceable back therefor, said back and body being provided with coöperating edge flanges and grooves constituting a light tight joint, one of the said coöperating parts on one member being resilient to act as a spring latch for automatically locking the engaging part on the other member.

2. The combination with a camera body, of a displaceable back therefor, said back and body being provided with coöperating edge flanges and grooves constituting a light tight joint, one of the said coöperating parts on one member being resilient to act as a spring latch for automatically locking the engaging part on the other member, and a releasing button on the member carrying the resilient part controlling the latter.

3. The combination with a camera body having grooves at its sides, an inturned flange at each end, of a displaceable back for the body having flanges coöperating with the side grooves of the latter, a groove in one end coöperating with one end flange of the body and a resilient plate at the other end having an outwardly opening groove provided with a curved lip adapted to act as a latch for automatically locking with the other end flange of the body, the entire flange and groove formation of the two parts constituting a light tight joint between the back and body.

ROBERT KROEDEL.

Witnesses:
MYRON J. HAYES,
ABE LISSON.

Copies of this patent may be obtained for five cents each, by addressing the "Commissioner of Patents. Washington, D. C."